D. T. SHARPLES.
PULSATING MECHANISM FOR MILKING MACHINES.
APPLICATION FILED MAR. 30, 1910.
1,034,314.
Patented July 30, 1912.
3 SHEETS—SHEET 1.
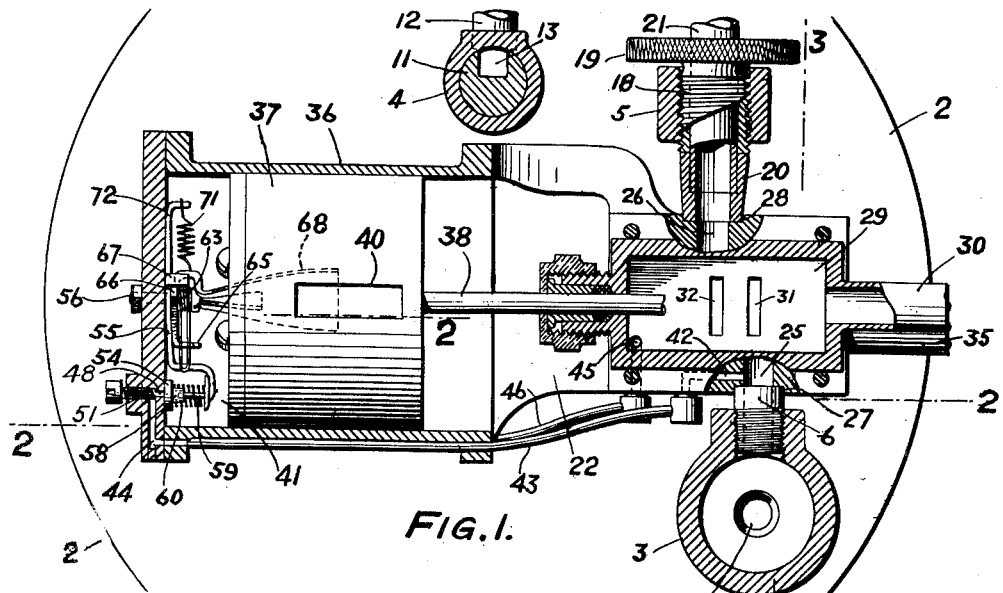
FIG. 1.
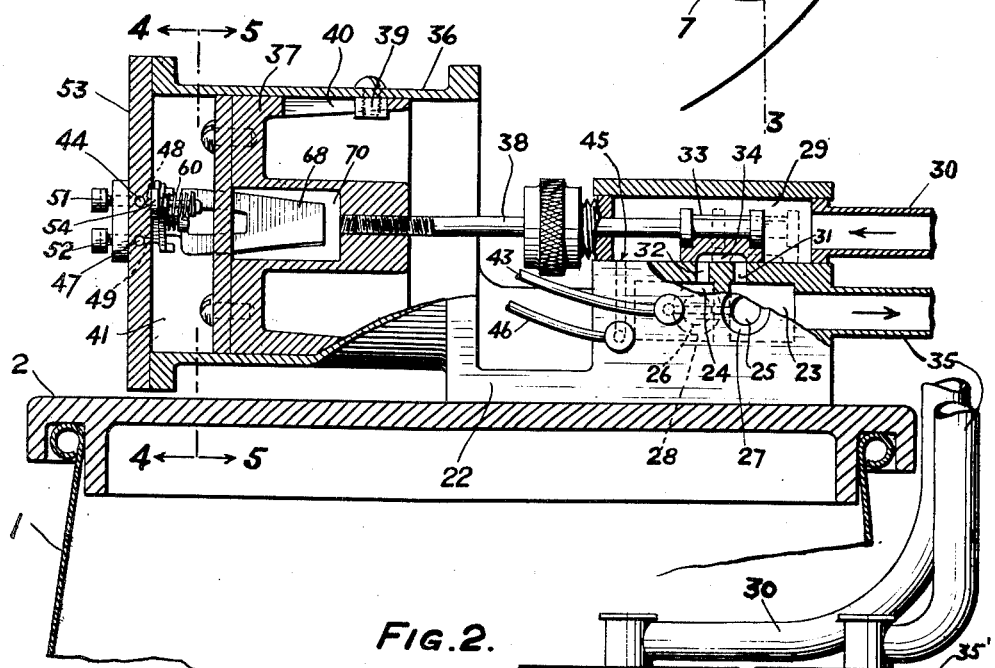
FIG. 2.
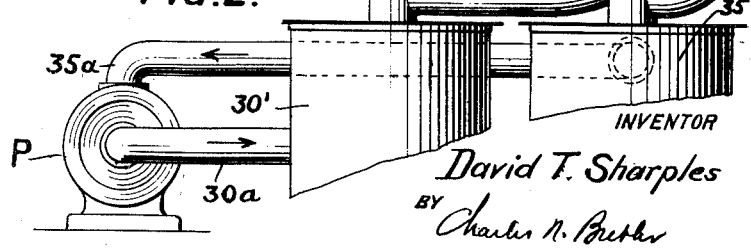
WITNESSES:
INVENTOR
David T. Sharples
BY
ATTORNEY.

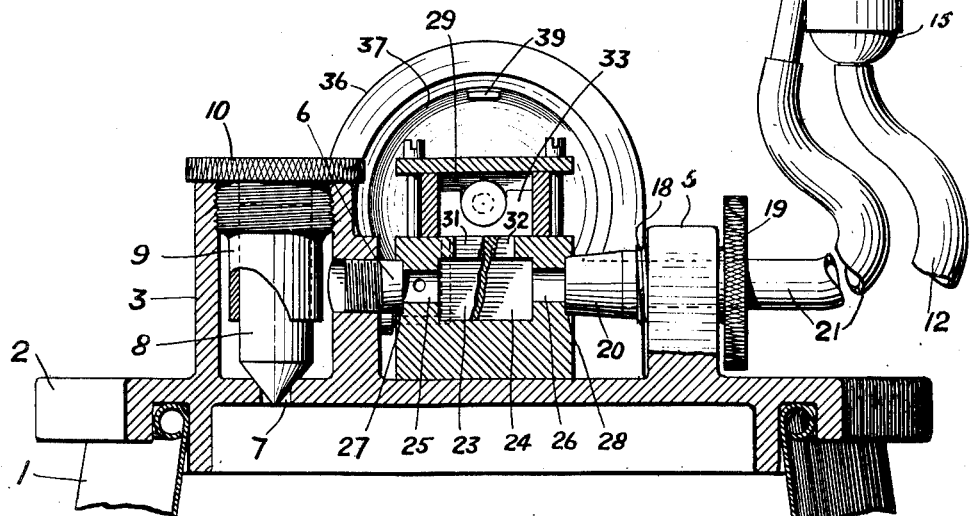

D. T. SHARPLES.
PULSATING MECHANISM FOR MILKING MACHINES.
APPLICATION FILED MAR. 30, 1910.

1,034,314.

Patented July 30, 1912.

3 SHEETS—SHEET 3.

WITNESSES:
Rob't R Kitchel.
J. Landenberger

INVENTOR
David T. Sharples
BY
Charles N. Butler
ATTORNEY.

UNITED STATES PATENT OFFICE.

DAVID TOWNSEND SHARPLES, OF WEST CHESTER, PENNSYLVANIA.

PULSATING MECHANISM FOR MILKING-MACHINES.

1,034,314.  Specification of Letters Patent.  Patented July 30, 1912.

Application filed March 30, 1910. Serial No. 552,334.

*To all whom it may concern:*

Be it known that I, DAVID T. SHARPLES, a citizen of the United States, residing at West Chester, in the county of Chester and State of Pennsylvania, have invented an Improved Pulsating Mechanism for Milking-Machines.

My invention relates to pulsating mechanism for controlling the application of pressure and suction to the teat cup in pneumatic milking machines.

It is designed to provide an improved mechanism whereby suction can be applied continuously to the inner or teat chamber of the cup, while suction alternating with pressure is applied to an exterior chamber separated from the inner chamber by a flexible tubular diaphragm.

It comprises means whereby the operations can be regulated in time and force to accommodate the action to cows having different milking characteristics.

It provides a convenient arrangement whereby ready assemblage and dissociation of the parts can be effected, the parts requiring washing and those which do not being comprised in separable groups adapted to be disconnected without separation of their respective elements.

The characteristic construction and functions of the invention are disclosed in the following description and the accompanying drawings in illustration thereof.

Figure 8:
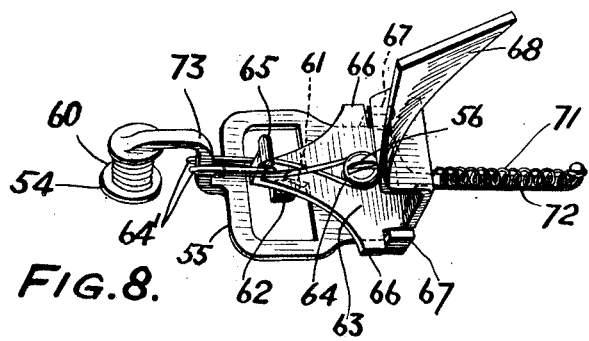
Figure 9:
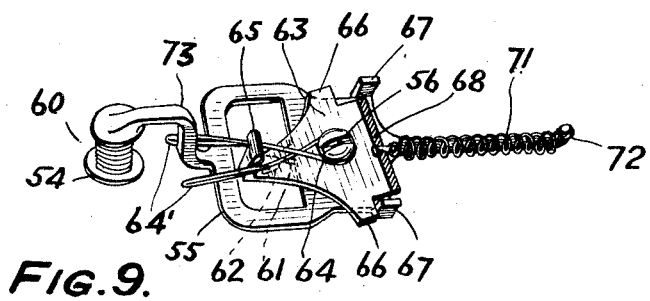
Figure 10:
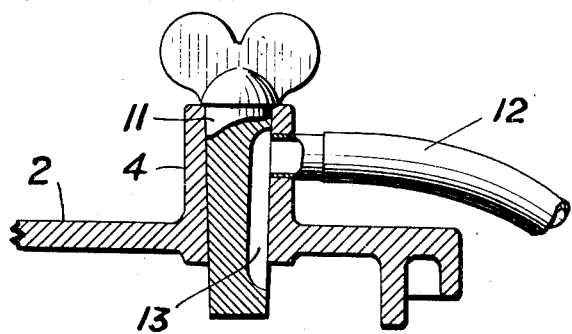

In the drawings, Figure 1 is a sectional plan view of the improvements applied to a pail; Fig. 2 is a sectional view taken on the line 2—2 of Fig. 1; Fig. 3 is a sectional view taken on the line 3—3 of Fig. 1; Fig. 4 is a section of the cylinder viewed in the direction of the arrows 4—4 of Fig. 2; Fig. 5 is a section of the cylinder viewed in the direction of the arrows 5—5 of Fig. 2; Fig. 6 is a perspective view of valve mechanism for controlling the air passages to the cylinder and piston; Fig. 7 is a sectional view illustrating mechanism coöperating with that shown in Fig. 6; Fig. 8 is a perspective view illustrating a position of the valve mechanism for controlling the cylinder ports; Fig. 9 is a perspective view, in part sectional, illustrating a second position of the mechanism shown in Fig. 8; and Fig. 10 is a sectional view taken through the valve mechanism connecting the pail with the interior chamber of the teat cup.

The pail 1 has an air tight cover 2 provided with the valve casing 3, the valve casing 4 and the bearing 5. The casing 3 is provided with a laterally extending nipple 6 and has in the bottom thereof a port 7 which is controlled by a check valve 8, the latter being movable in the guiding barrel 9 of the casing's plug 10. The casing 4, containing the valve 11, connects the interior of the pail with the tube 12 through the port 13. The tube 12 is connected with the interior of the flexible tube 14 of the teat cup 15, the latter having the shell 16 between which and the tube 14 is a chamber 17. The bearing 5 has a threaded connection with the sleeve 18, which is revolved by the milled head 19 and bears against a nipple 20 on a tube 21; the latter passing through the sleeve to the teat cup 15 and communicating with the chamber 17.

The pulsator comprises a body 22 which rests on the cover 2 and is provided with the chambers 23 and 24 which communicate with the respective lateral passages 25 and 26. Seats 27 and 28 are formed in the body around the outer ends of the respective passages and are adapted for receiving the ends of the respective nipples 6 and 20, through which ready connection and separation are effected by correspondingly turning the sleeve 18. A valve chamber 29, to which air pressure is constantly supplied by the duct 30, communicates with the respective chambers 23 and 24 by the corresponding ports 31 and 32, the ports being controlled by a slide valve 33 having the port 34 adapted for connecting the ports 31 and 32. A suction duct 35 is connected with the chamber 23 and is brought into communication with the chamber 24, periodically, by the valve 33. The pressure is provided in the duct 30 from the compressed air chamber 30′ which is connected by the duct 30ᵃ with the pump P, and the suction is provided in the duct 35 by its connection with the vacuum chamber 35′ which is exhausted through the duct 35ᵃ by the pump. A cylinder 36, fixed to the body 22, contains a piston 37 which is connected by a rod 38 with the valve 33, the rod being journaled on the valve and screwed into the piston so that the length of the rod and the limits of the valve's movements can be varied to vary the pneumatic action. The piston is prevented from turning by a guide 39 which is fixed to the cylinder and lies in the way 40 of the piston. The cylinder chamber 41 is connected with the passage 25 by the ducts 42, 43 and 44 and with the chamber 29 by the ducts 45, 46 and 47. The ducts 44 and 47 have the respective ports 48 and 49 which are variable to control the time of the action by the adjustable needle valves 51 and 52, the needle valves being screwed into the head 53 of the cylinder.

Valve mechanism for controlling the ports 48 and 49 is located within the cylinder, thereby avoiding the necessity for packing. This mechanism comprises a valve 54 carried by a lever 55 which rocks on the arbor 56 fixed to the cylinder head, the lever having therein the elongated opening or bearing 57 which engages the fulcrum or arbor. The valve is provided with the sleeve 58 which is movable longitudinally on a finger 59 carried by the lever, and a spring 60 on the finger holds the valve against the cylinder head. A lug 61, carried by the lever, is adapted for engaging a stop 62, carried by the cylinder head; the lever being movable longitudinally to permit the lug to pass the stop through the play permitted by the bearing 57. A crank lever 63 is fulcrumed on the arbor 56 and is provided with the finger 65, the laterally extending lugs 66 which engage lugs 67 on the lever 55, and the helical arm 68 which extends through the slot 69 in the piston into the piston chamber 70. A coiled spring 71 connects the arm 68 with the arm 72, by which the lever 55 is normally held in such position that its oscillation is prevented by the engagement of the parts 61 and 62, the lever being permitted to swing by drawing it back against the action of the spring so that the part 61 can pass the part 62. A spring 64, coiled on the arbor 56, has arms 64' which engage opposite sides of the members 73 and 65 of the respective parts 55 and 63.

The piston 37, in reciprocating, acts through the helical arm 68 to oscillate the arm 63, which acts through its parts 66 on the part 67 of the lever 55 to retract the latter and disengage the part 61 from the part 62, upon which the stress now communicated by a spring arm 64' to the part 73 effects a quick throw of the valve 54 from one to the other of the ports 48 and 49. The arm 63 turns upon its bearing 56 during the retraction of the lever 55 and, by bearing upon one of the arms 64', tightens the coil 64 so as to cause the other arm 64' to press against the part 73. During the retraction of the lever 55, the valve 54 continues to cover the port with which it registers.

In operation, with the apparatus in the position shown, air pressure above that of the atmosphere is communicated from the conduit 30, through the chamber 29, and conduits 45, 46 and 47 to the chamber 41, the piston 37 and the valve 33 being moved back thereby. In this relation of the mechanisms, the conduit 35 is in communication with the teat cup chamber 17, through the connected passages 23, 31, 34, 32, 24, and 21, the length of the impulses or the periods of suction and pressure being regulable by adjusting the valve 33 and regulating the extent to which the ports 31 and 32 are opened to the port 34. As the piston 37 moves the valve 33 to its dotted line position, cutting off the suction from the conduit 35 to the teat cup chamber 17 by closing the communication between the ports 31 and 32 and admitting pressure to such chamber by opening communication between the chamber 29 and the port 32, sufficient movement is communicated from the arm 68 to the arm 63 to retract the lever 55 and permit it to be thrown by the spring 64, effecting the quick throw of the valve 54 from the port 48 to the port 49. Suction is now applied to the cylinder chamber 41, from the conduit 35, through the connected passages 23, 25, 42, 43, and 44, with the result that the piston 37 moves inwardly, the valve 33 moves from the dotted toward the full line position, and in the course of travel of the piston the valve 54 is again thrown to reverse the operation.

It will be understood from the foregoing description that the apparatus, while effecting the application of suction and pressure alternately through the passage 21 to the chamber 17, effects the constant application of suction to the interior of the tube 14 by the latter's connection with the suction conduit 35 through the parts 23, 25, 6, 3, 7, 1, 4, 13, and 12.

Having described my invention, I claim:

1. A pulsator having a pressure duct and a suction duct connected therewith, a receptacle having a cover on which said pulsator is detachably supported, means comprising a detachable connector whereby said pulsator is engaged on said cover and suction is communicated from said pulsator through said cover to the interior of said receptacle, a teat cup having a compartment, means comprising a detachable connection whereby said pulsator is engaged on said cover and suction and pressure are alternately communicated from said pulsator to said compartment, said teat cup having a second compartment, and means whereby said second compartment communicates with the interior of said receptacle through said cover.

2. A pulsator having fluid passages, a receptacle having a cover on which said pulsator is detachably supported, separable means comprising a nipple whereby said pulsator is engaged on said cover and one of said passages is connected with said receptacle, further means comprising a nipple whereby said pulsator is engaged on said cover and a second of said passages is connected, a teat cup, and means whereby said teat cup is connected with said second nipple.

3. A pulsator having fluid passages, a receptacle having a cover on which said pulsator is detachably supported, means comprising a valve casing whereby said pulsator is engaged on said cover and a passage thereof connected with the interior of said receptacle, a bearing on said cover, and means comprising a sleeve threaded in said bearing whereby said pulsator is engaged on said cover and a second passage thereof connected.

4. A pulsator having fluid passages, a receptacle, means comprising a nipple adapted for connecting one of said passages with said receptacle, a tube, a nipple adapted for connecting said tube with the other of said passages, and mechanism connected with said receptacle for effecting the engagement and disengagement of said nipple last named.

5. A pulsator having fluid passages, a pail having a cover, a nipple connected with said cover and communicating with said pail, a bearing on said cover, a second nipple, and means connecting said nipple last named with said bearing and adapted for effecting the engagement of said nipples with the respective passages of said pulsator.

6. A pulsator having fluid passages, a pail having a cover, a valve chamber having a port communicating with said pail, a valve for controlling said port, means whereby one of said passages communicates with the interior of said chamber, a bearing on said cover, a sleeve movable in said bearing, a tube, and means whereby said sleeve effects communication between said tube and the second of said passages.

7. A pulsator having a suction and a pressure duct, a pail having a cover, a valve chamber having a port communicating through said cover with said pail, a conduit for effecting communication between said pulsator and chamber, a teat cup having a flexible diaphragm forming an inner and an outer compartment, a conduit for effecting communication between said pulsator and the outer of said compartments, a second valve chamber communicating through said cover with said pail, and means for connecting said second valve chamber with the inner of said teat cup compartments, said pulsator having means for connecting said first chamber with said suction duct and for connecting the conduit leading to said outer teat cup compartment alternately with said suction and pressure ducts.

8. The combination of a pail, a teat cup, a conduit connecting said pail with a compartment of said teat cup, a pulsator, a conduit connecting said pulsator with a second compartment of said teat cup, a conduit for connecting said pulsator with said pail, a suction duct connected with said pulsator, and a pressure duct connected with said pulsator, said pulsator having means for connecting said pressure and suction ducts alternately with said second conduit.

9. A pulsator comprising a pair of separate chambers, a valve chamber, ports adapted for connecting said valve chamber with the respective chambers first named, a valve for controlling said ports, a cylinder, a piston in said cylinder, means for connecting said piston with said valve, a conduit connecting one of said first named chambers with said cylinder, a conduit connecting said valve chamber with said cylinder, a valve for alternately opening and closing said conduits, and means operated by said piston for operating said valve last named.

10. A pulsator comprising a pair of separate chambers, a valve chamber, ports adapted for connecting said valve chamber with the respective chambers first named, a valve having means for controlling and connecting said ports, a cylinder, a piston in said cylinder, means for connecting said valve in adjustable relation to said piston, a conduit connecting one of said first named chambers with said cylinder, a conduit connecting said valve chamber with said cylinder, a valve in said cylinder, and means operated by said piston for operating said valve last named to close and open said conduits alternately.

11. A pulsator comprising a pair of separate chambers, a suction duct connected with one of said chambers, a valve chamber, ports whereby said valve chamber is adapted to be connected with the respective separate chambers, a valve adapted for controlling said ports and connecting said separate chambers, a pressure duct connected with said valve chamber, a cylinder, a piston in said cylinder, means whereby said piston operates said valve, a conduit connecting said valve chamber and said cylinder, a conduit connecting one of said separate chambers and said cylinder, means for regulating the respective conduits, a valve for alternately opening and closing the respective conduits, and means operated by said piston for operating said valve last named.

12. A pulsating mechanism comprising a cylinder, a piston therein, a pressure duct adapted to be connected with said cylinder, means for forcing air through said pressure duct, a suction duct adapted to be connected with said cylinder, means for exhausting said suction duct, and valve mechanism operated by said piston to effect the alternate communication of said ducts with said cylinder.

13. A pulsating mechanism comprising a cylinder, a piston therein, ports communicating with said cylinder, a valve located in said cylinder for controlling said ports, a rocking and reciprocating member connected with said valve, stop mechanism for holding said member, and means movable by said piston for disengaging said stop mechanism and rocking said member.

14. A pulsating mechanism comprising a cylinder, a piston therein, ports adapted to communicate with said cylinder, a valve for controlling said ports, a rocking and reciprocating member connected with said valve, stop mechanism for holding said member, a fulcrumed member having a helical arm engaged and rocked by said piston, and means whereby said fulcrumed member operates said rocking and reciprocating member.

15. A cylinder having ports adapted to communicate therewith, a valve adapted for controlling said ports, a fulcrumed lever movable longitudinally on its bearings for operating said valve, stop mechanism adapted for holding said lever, a fulcrumed crank lever having means for engaging and moving said first named lever longitudinally to disengage said stop mechanism, a spring connecting said levers for effecting the reverse movement of said first lever to position for effecting the reëngagement of said stop mechanism, a second spring connecting said levers whereby said valve is thrown upon the disengagement of said stop mechanism, and a piston adapted for engaging and turning an arm of said crank lever.

16. A pulsator having a cylinder, ports adapted for communicating with said cylinder, a valve in said cylinder for controlling said ports, a piston, means whereby said piston operates said valve, a pressure duct communicating with one of said ports, and a suction duct communicating with the other of said ports.

17. The combination of a receptacle and a teat cup with a pulsator comprising a piston and a valve relatively adjustable to regulate the pulsations communicated to said cup.

18. A pulsator having a cylinder, a pressure duct having a port communicating with the interior of said cylinder, a suction duct having a port communicating with the interior of said cylinder, a valve in said cylinder for controlling said ports, a piston in said cylinder, and means whereby said piston operates said valve.

In witness whereof I have hereunto set my name this 26 day of March, 1910, in the presence of the subscribing witnesses.

DAVID TOWNSEND SHARPLES.

Witnesses:
MARY B. DARLINGTON,
J. CONELY HALL.